US010430308B2

(12) United States Patent
Cinar

(10) Patent No.: US 10,430,308 B2
(45) Date of Patent: Oct. 1, 2019

(54) METHOD OF ESTIMATING REMAINING LIFE OF SOLID STATE DRIVE DEVICE

(71) Applicant: SAMSUNG ELECTRONICS CO., LTD., Suwon-si, Gyeonggi-do (KR)

(72) Inventor: Yusuf Cinar, Yongin-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 179 days.

(21) Appl. No.: 15/706,923

(22) Filed: Sep. 18, 2017

(65) Prior Publication Data

US 2018/0173602 A1 Jun. 21, 2018

(30) Foreign Application Priority Data

Dec. 20, 2016 (KR) .................. 10-2016-0174493
Jan. 20, 2017 (KR) .................. 10-2017-0009738

(51) Int. Cl.
G06F 11/00 (2006.01)
G06F 11/30 (2006.01)
G06F 11/34 (2006.01)
G06F 11/24 (2006.01)
G06F 11/22 (2006.01)

(52) U.S. Cl.
CPC .......... *G06F 11/3034* (2013.01); *G06F 11/24* (2013.01); *G06F 11/3058* (2013.01); *G06F 11/34* (2013.01); *G06F 11/008* (2013.01); *G06F 11/2205* (2013.01)

(58) Field of Classification Search
CPC .... G06F 11/008; G06F 11/2205; G06F 11/24; G06F 11/3034; G06F 11/3058; G06F 11/34
See application file for complete search history.

(56) References Cited

U.S. PATENT DOCUMENTS

2007/0260811 A1 11/2007 Merry, Jr. et al.
2007/0266200 A1 11/2007 Gorobets et al.
2010/0082913 A1 4/2010 Mukai et al.
2013/0283129 A1 10/2013 Schuette et al.
2014/0172325 A1 6/2014 Naji
2014/0181363 A1 6/2014 Hoang et al.
2014/0181595 A1 6/2014 Hoang et al.
2015/0032948 A1 1/2015 Yoon et al.
2015/0120636 A1 4/2015 Gao (Continued)

OTHER PUBLICATIONS

Cho, et al, Fatigue life evaluation of SSD solder ball due to the installation, pp. 495-500.

*Primary Examiner* — Joshua P Lottich
(74) *Attorney, Agent, or Firm* — Lee & Morse, P.C.

(57) ABSTRACT

A method for estimating the remaining life of a solid state drive (SSD) device includes generating a sensing value by periodically measuring an environmental variable, generating a load value associated with the SSD device based on the sensing value and a distance between the sensor and the SSD device, calculating stress applied to the SSD device based on the load value, calculating damage of the SSD device based on a stress-life curve and the stress, and determining the remaining life of the SSD device based on a difference between a threshold value and the damage. The stress-life curve may represent a relationship between the stress and life of the SSD device.

20 Claims, 13 Drawing Sheets

(56) References Cited

U.S. PATENT DOCUMENTS

| | | | |
|---|---|---|---|
| 2015/0317090 A1* | 11/2015 | Samanta | G06F 3/0635 |
| | | | 711/103 |
| 2016/0034206 A1* | 2/2016 | Ryan | G11C 16/349 |
| | | | 711/103 |
| 2016/0034208 A1 | 2/2016 | Cepulis | |
| 2016/0179602 A1 | 6/2016 | Gorobets et al. | |
| 2017/0172473 A1* | 6/2017 | Wedekind | G16H 40/63 |
| 2017/0285970 A1* | 10/2017 | Li | G06F 3/0653 |

* cited by examiner

METHOD OF ESTIMATING REMAINING LIFE OF SOLID STATE DRIVE DEVICE

CROSS-REFERENCE TO RELATED APPLICATION

Korean Patent Application No. 10-2016-0174493, filed on Dec. 20, 2016 and Korean Patent Application No. 2017-0009738, filed on Jan. 20, 2017, and entitled: "Method of Estimating Remaining Life of Solid State Drive Device," is incorporated by reference herein in their entirety.

BACKGROUND

1. Field

One or more embodiments described herein relate a method of estimating the remaining life of a solid state drive device.

2. Description of the Related Art

Solid state drive (SSD) devices have been used in various systems and products, including but not limited to laptop computers, cars, airplanes, and drones. The frequency of errors in an SSD device may increase over time. At some point, the SSD device will come to the end of its useful life. However, the host system of the SSD device may still be operating normally. This may cause critical errors in the host device.

SUMMARY

In accordance with one or more embodiments, a method for estimating a remaining life of a solid state drive (SSD) device in a system which includes a sensor, includes generating, by the sensor, a sensing value by periodically measuring an environmental variable; generating, by the SSD device, a load value associated with the SSD device based on the sensing value and a distance between the sensor and the SSD device; calculating, by the SSD device, stress applied to the SSD device based on the load value; calculating, by the SSD device, damage of the SSD device based on a stress-life curve and the stress, the stress-life curve representing a relationship between the stress and life of the SSD device; and determining, by the SSD device, the remaining life of the SSD device based on a difference between a threshold value and the damage.

In accordance with one or more other embodiments, a method for estimating a remaining life of a solid state drive (SSD) device in a system which includes first through n-th sensors, where n is a positive integer greater than or equal to two, includes: generating, by the first through n-th sensors, first through n-th sensing values by periodically measuring first through n-th environmental variables; generating, by the SSD device, first through n-th load values associated with the SSD device based on the first through n-th sensing values and distances between the first through n-th sensors and the SSD device; calculating, by the SSD device, first through n-th stresses applied to the SSD device based on the first through n-th load values; calculating, by the SSD device, damage of the SSD device based on first through n-th stress-life curves and the first through n-th stresses, each of the first through n-th stress-life curves representing a relationship between a respective one of the first through n-th stresses and life of the SSD device; and determining, by the SSD device, the remaining life of the SSD device based on a difference between a threshold value and the damage.

In accordance with one or more other embodiments, a method for estimating a remaining life of a solid state drive (SSD) device in a system which includes a sensor, the SSD device including first through m-th components, where m is a positive integer greater than or equal to two, includes generating, by the sensor, a sensing value by periodically measuring an environmental variable; generating, by the SSD device, a load value associated with the SSD device based on the sensing value and a distance between the sensor and the SSD device; calculating, by the SSD device, first through m-th stresses applied to the first through m-th components based on the load value; calculating, by the SSD device, first through m-th damages of the first through m-th components based on first through m-th stress-life curves and the first through m-th stresses, each of the first through m-th stress-life curves representing a relationship between a respective one of the first through m-th stresses and life of the SSD device; determining, by the SSD device, first through m-th candidate remaining lives of the SSD device based on differences between first through m-th threshold values and first through m-th damages; and determining, by the SSD device, a minimum remaining life among the first through m-th candidate remaining lives as the remaining life of the SSD device.

In accordance with one or more other embodiments, a non-transitory computer readable medium storing a program for estimating a remaining life of a solid state drive (SSD) device in a system which includes a sensor, the program including first code to generate a load value associated with the SSD device, the load value based on a sensing value and a distance between the sensor and the SSD device, the sensing value based on a periodically measured environmental variable; second code to calculate stress applied to the SSD device based on the load value; third code to calculate damage of the SSD device based on a stress-life curve and the stress, the stress-life curve representing a relationship between the stress and life of the SSD device; and fourth code to determine the remaining life of the SSD device based on a difference between a threshold value and the damage.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
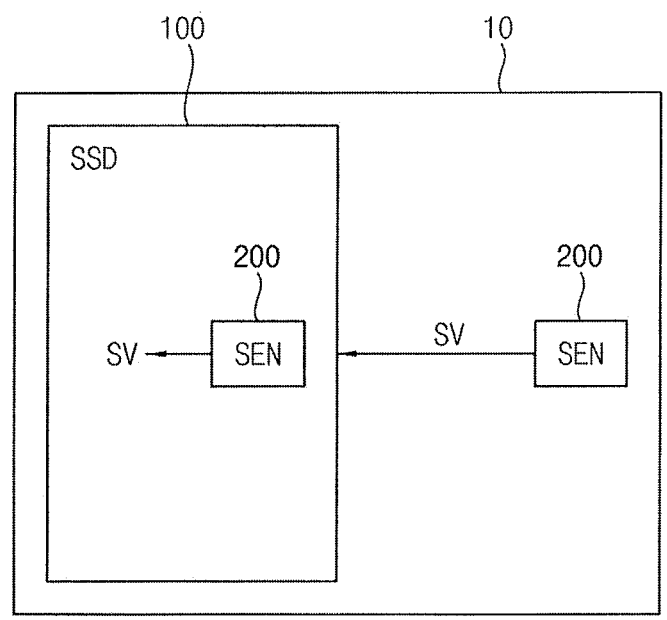
FIG. 1 illustrates an embodiment of a system.

FIG. 1 illustrates an embodiment of a system 10 which includes a solid state drive (SSD) device 100 and a sensor (SEN) 200. In some example embodiments, the system 10 may be one of various systems, e.g., a laptop computer, a car, an airplane, a drone, etc., that include the SSD device 100. In some example embodiments, the sensor 200 may be inside the SSD device 100 or outside the SSD device 100, as in FIG. 1.

The sensor 200 generates a sensing value SV by periodically measuring an environmental variable. In some example embodiments, the sensor 200 may periodically measure the environmental variable, which corresponds to at least one of temperature, humidity, pressure, acceleration, vibration, mechanical stress, shock, radiation, dust, or electrical stress, to generate the sensing value SV. In this example, the sensor 200 may include at least one of temperature sensor, humidity sensor, pressure sensor, acceleration sensor, vibration sensor, mechanical stress sensor, shock sensor, radiation sensor, dust sensor, or electrical stress sensor. In one embodiment, the sensor 200 may generate the sensing value SV by measuring at least one of various environmental variables.

The SSD device 100 estimates remaining life of the SSD device 100 based on the sensing value SV that is periodically provided from the sensor 200. In some example embodiments, the SSD device 100 may apply the sensing value SV that is periodically provided from the sensor 200 to cumulative damage law to estimate the remaining life of the SSD device 100.

Figure 2:
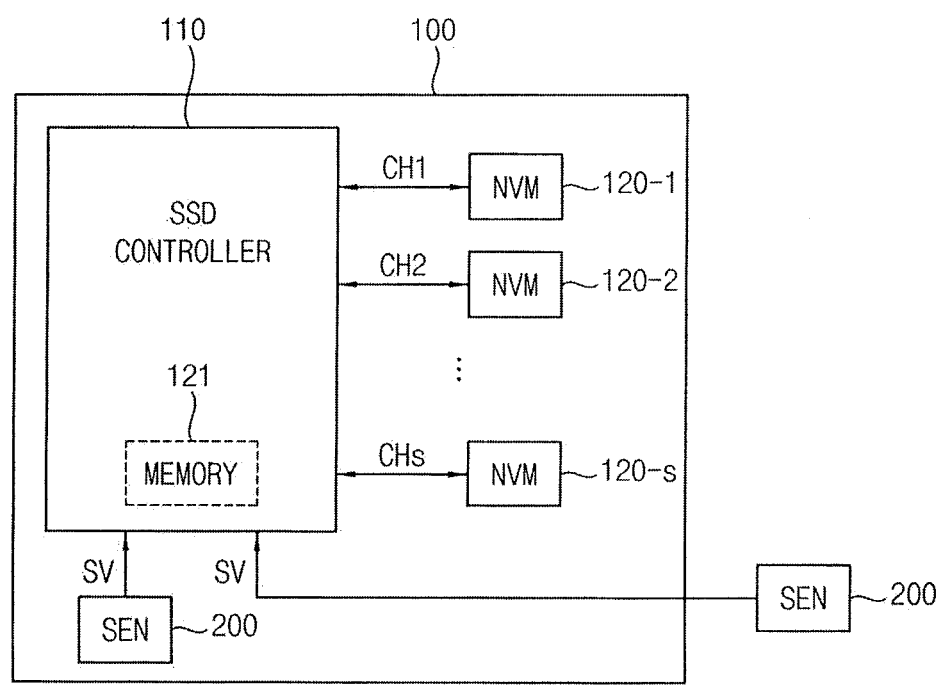
FIG. 2 illustrates an embodiment of a solid state drive (SSD) device.

FIG. 2 illustrates an embodiment of a solid state drive (SSD) device 100, which, for example, may be in the system 10 of FIG. 1. Referring to FIG. 2, a SSD device 100 may include a SSD controller 110 and a plurality of nonvolatile memory devices 120-1, 120-2, ..., 120-s, where s is a positive integer. The plurality of nonvolatile memory devices 120-1, 120-2, ..., 120-s may be used as storage mediums of the SSD device 100. In some example embodiments, each of the nonvolatile memory devices 120-1, 120-2, ..., 120-s may include at least one flash memory device.

The SSD controller 110 may be connected to each of the plurality of nonvolatile memory devices 120-1, 120-2, ..., 120-s via a respective one of a plurality of channels CH1, CH2, ..., CHs. The SSD controller 110 may control overall operations of the nonvolatile memory devices 120-1, 120-2, ..., 120-s. For example, the SSD controller 110 may receive a command signal and an address signal from an external host, and may exchange data with the external host. The SSD controller 110 may write (e.g., program or store) the data into the nonvolatile memory devices 120-1, 120-2, ..., 120-s, or may read (e.g., retrieve) the data from nonvolatile memory devices 120-1, 120-2, ..., 120-s.

The SSD controller 110 may periodically receive the sensing value SV from the sensor 200 that is inside and/or outside the SSD device 100. The SSD controller 110 may estimate the remaining life of the SSD device 100 based on the sensing value SV that is periodically provided from the sensor 200.

A method of estimating the remaining life of the SSD device 100 that is performed by the SSD controller 110 will be described in detail with reference to FIG. 3.

Figure 3:
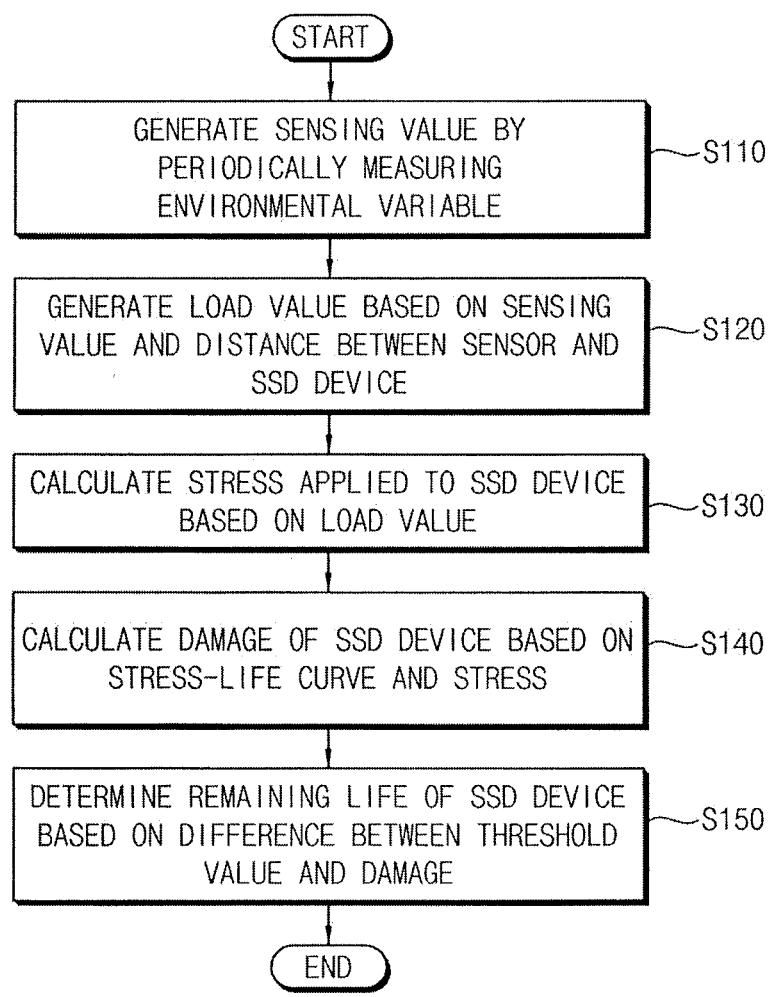
FIG. 3 illustrates an embodiment of a method for estimating the remaining life of an SSD device.

FIG. 3 illustrates an embodiment of method for estimating the remaining life of a SSD device according to example embodiments. The method of FIG. 3 may be performed, for example, by the system 10 of FIG. 1. The method for estimating the remaining life of the SSD device 100 in the system 10 will be described with reference to FIGS. 1, 2, and 3.

The sensor 200 may generate the sensing value SV by periodically measuring the environmental variable (operation S110). In some example embodiments, the sensor 200 may periodically measure the environmental variable, which corresponds to at least one of temperature, humidity, pressure, acceleration, vibration, mechanical stress, shock, radiation, dust, or electrical stress, to generate the sensing value SV. In this example, the sensor 200 may include at least one of temperature sensor, humidity sensor, pressure sensor, acceleration sensor, vibration sensor, mechanical stress sensor, shock sensor, radiation sensor, dust sensor, or electrical stress sensor.

The SSD device 100 may receive the sensing value SV that is periodically generated from the sensor 200. The SSD device 100 may generate a load value associated with the SSD device 100 based on the sensing value SV and a distance between the sensor 200 and the SSD device 100 (operation S120).

In some example embodiments, the sensor 200 may be inside the SSD device 100. In this example, the environmental variable that is measured by the sensor 200 may be substantially the same as an environmental variable that is applied to (e.g., affected to or has an effect on) the SSD device 100, and the distance between the sensor 200 and the SSD device 100 may be zero. Thus, the SSD device 100 may provide the sensing value SV as the load value without converting the sensing value SV. For example, the SSD device 100 may generate the load value by performing one-to-one conversion on the sensing value SV.

In other example embodiments, the sensor 200 may be outside the SSD device 100. In this example, the environmental variable that is measured by the sensor 200 may be different from an environmental variable that is applied to (e.g., affected to or has an effect on) the SSD device 100. Thus, the SSD device 100 may generate the load value corresponding to the sensing value SV based on the distance between the sensor 200 and the SSD device 100. For example, the SSD device 100 may convert the sensing value SV to the load value based on the distance between the sensor 200 and the SSD device 100.

For example, when the sensor 200 is relatively closer to the SSD device 100, the SSD device 100 may change the sensing value SV by a relatively small value to generate the load value. For another example, when the sensor 200 is relatively farther to the SSD device 100, the SSD device 100 may change the sensing value SV by a relatively large value to generate the load value.

In some example embodiments, the SSD device 100 may generate the load value corresponding to the sensing value SV based on a load curve. The load curve may be defined, for example, based on the distance between the sensor 200 and the SSD device 100. For example, the load curve may be predefined based on experimental data obtained by repetitive experiments for the system 10.

Figure 4:
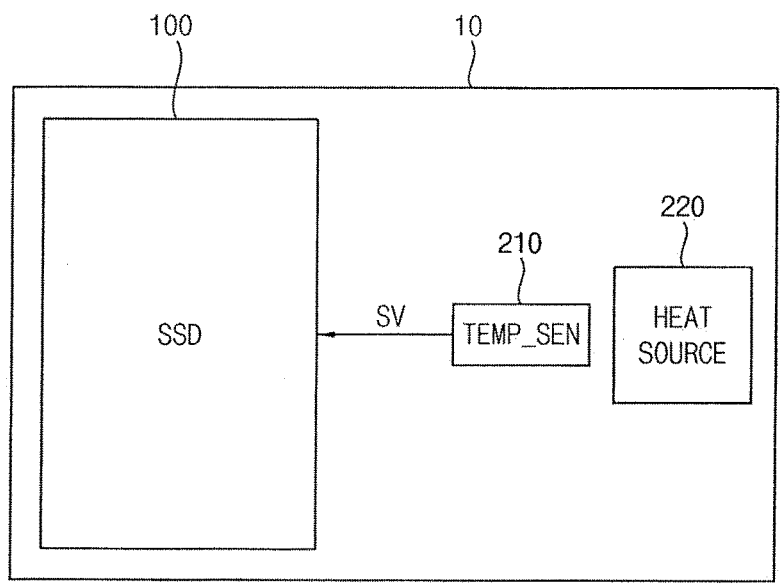
FIGS. 4 and 5 illustrate embodiments of an operation for converting a sensing value to a load value.
Figure 5:
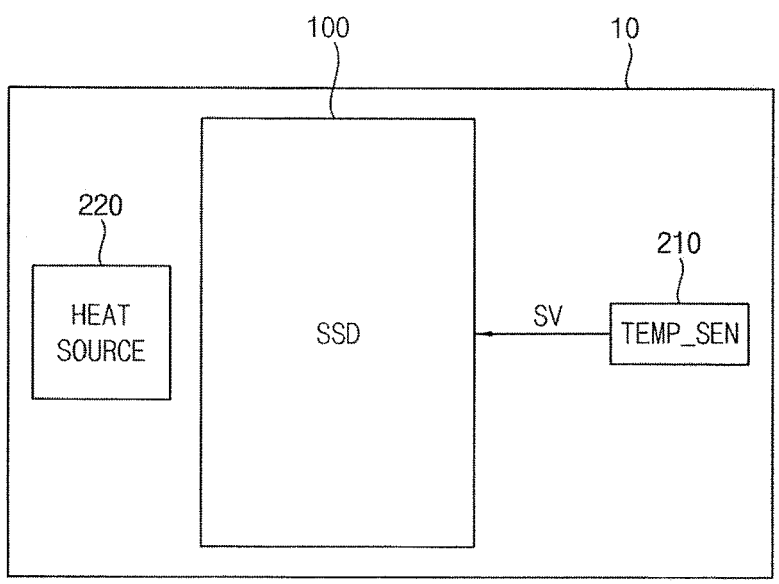
Figure 6:
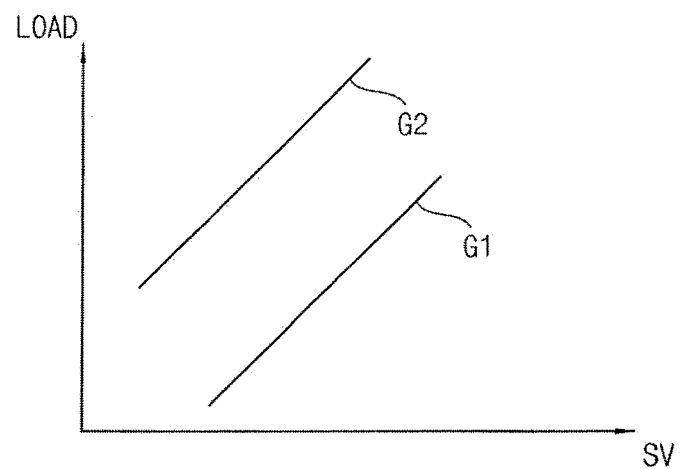
FIG. 6 illustrates an example of a load curve.

FIGS. 4 and 5 illustrate embodiments of an operation for converting a sensing value to a load value that is performed by the SSD device in FIG. 1. FIG. 6 is a graph illustrating an example of a load curve used for generating the load value. In FIGS. 4 and 5, the sensor 200 in the system 10 may correspond to a temperature sensor (TEMP_SEN) 210, and the temperature sensor 210 may be outside the SSD device 100. In FIG. 6, the horizontal axis represents the sensing value SV that is generated from the temperature sensor 210. The vertical axis represents the load value that is associated with (e.g., applied to, affected to or has an effect on) the SSD device 100.

Referring to FIGS. 4 and 5, the system 10 may include a heat source 220 that generates heat. In an example of FIG. 4, the SSD device 100 may be located at a first side (e.g., the left side) of the temperature sensor 210. The heat source 220 may be located at a second side (e.g., the right side) of the temperature sensor 210. For example, the SSD device 100 and the heat source 220 may be at different sides with respect to the temperature sensor 210. In this example, a temperature measured by the temperature sensor 210 may be higher than a temperature applied to the SSD device 100.

A load curve for the example of FIG. 4 may be defined as a first curve G1 in FIG. 6. In this example, the SSD device 100 may decrease the sensing value SV by a predetermined value to generate the load value.

In an example of FIG. 5, the heat source 220 may be located at a first side (e.g., the left side) of the SSD device 100. The temperature sensor 210 may be located at a second side (e.g., the left side) of the SSD device 100. For example the heat source 220 and the temperature sensor 210 may be located at different sides with respect to the SSD device 100. In this example, a temperature measured by the temperature sensor 210 may be lower than a temperature applied to the SSD device 100.

A load curve for the example of FIG. 5 may be defined as a second curve G2 in FIG. 6. In this example, the SSD device 100 may increase the sensing value SV by a predetermined value to generate the load value.

Although operation S120 in FIG. 3 is described above with reference to an example where the sensor 200 is outside the SSD device 100 and an example where the load value corresponding to the sensing value SV is generated based on the load curve that is predefined based on the distance between the sensor 200 and the SSD device 100. In one embodiment, the SSD device 100 may generate the load value corresponding to the sensing value SV based on a load curve that is predefined in various ways.

Referring back to FIG. 3, the SSD device 100 may calculate stress that is applied to (e.g., affected to or has an effect on) the SSD device 100 based on the load value (operation S130). In some example embodiments, SSD device 100 may calculate stress corresponding to the load value based on a predefined load-stress conversion curve.

Figure 7:
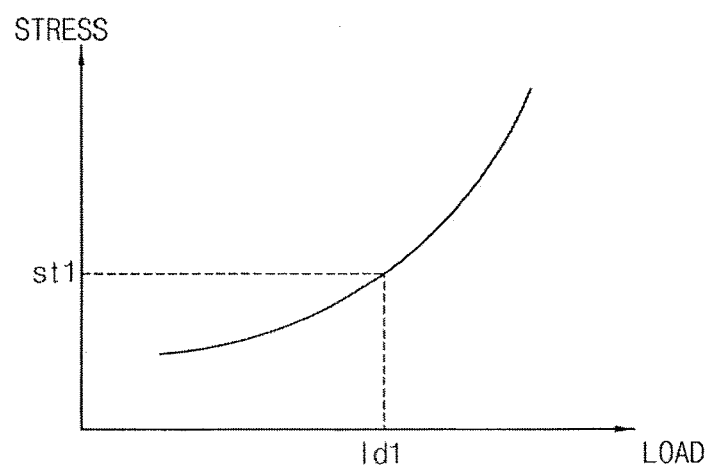
FIG. 7 illustrate an example of a load-stress conversion curve.

FIG. 7 illustrates an example of a load-stress conversion curve used for calculating stress. In FIG. 7, a horizontal axis represents the load value that is generated in operation S120, and a vertical axis represents the stress that is applied to (e.g., affected to or has an effect on) the SSD device 100.

Referring to FIG. 7, the stress applied to the SSD device 100 may increase as the load value increases, and the stress applied to the SSD device 100 may decrease as the load value decreases.

As illustrated in FIG. 7, the stress applied to the SSD device 100 may be nonlinearly proportional to the load value. In some example embodiments, the load-stress conversion curve may be predefined based on experimental data that are obtained by measuring the stress applied to the SSD device 100 depending on the change of the load value.

As described above, the SSD device 100 may obtain the stress corresponding to the load value based on the load-stress conversion curve. For example, as illustrated in FIG. 7, if the load value corresponds to "ld1," the SSD device 100 may obtain the stress corresponding to "st1."

Operation S130 in FIG. 3 is described above with reference to an example where the stress applied to the SSD device 100 is calculated based on the load value. The SSD device 100 may calculate strain that is applied to (e.g., affected to or has an effect on) the SSD device 100 based on the load value. In one embodiment, a load-strain conversion curve is used for calculating strain, e.g., stress may be replaced with strain. For convenience of description, the example embodiments will be described later based on stress (not strain).

Referring back to FIG. 3, the SSD device 100 may calculate damage of the SSD device 100 based on a stress-life curve and the stress (operation S140). The stress-life curve may represent a relationship between the stress and life (e.g., life span or desired life time) of the SSD device 100. In some example embodiments, the SSD device 100 may calculate the damage corresponding to the stress based on the cumulative damage law. For example, the SSD device 100 may calculate the damage corresponding to the stress based on Miner's rule.

Figure 8:
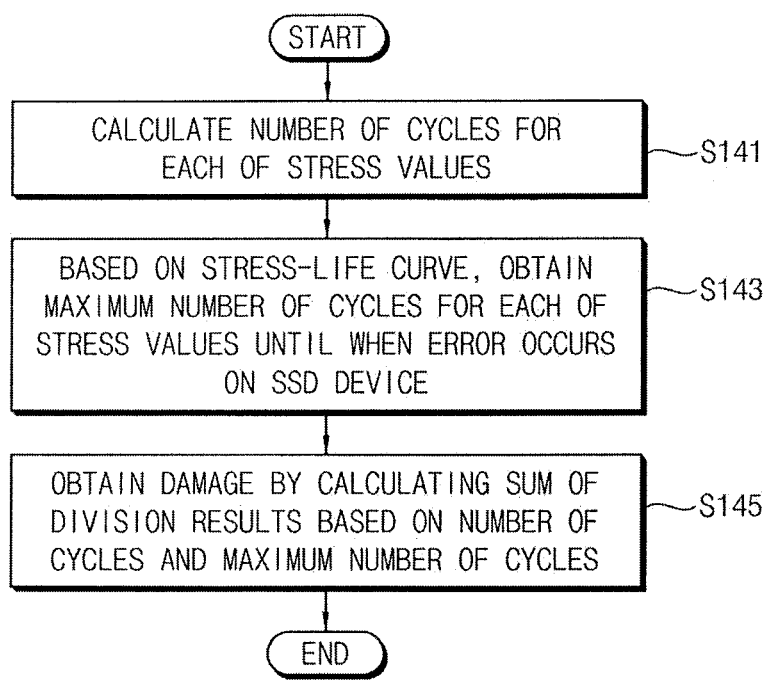
FIG. 8 illustrates an embodiment for calculating damage of an SSD device.

FIG. 8 illustrates an embodiment for calculating damage of the SSD device in FIG. 3. In an example of FIG. 8, the damage corresponding to the stress may be calculated by the SSD device 100 based on the Miner's rule.

Figure 9:
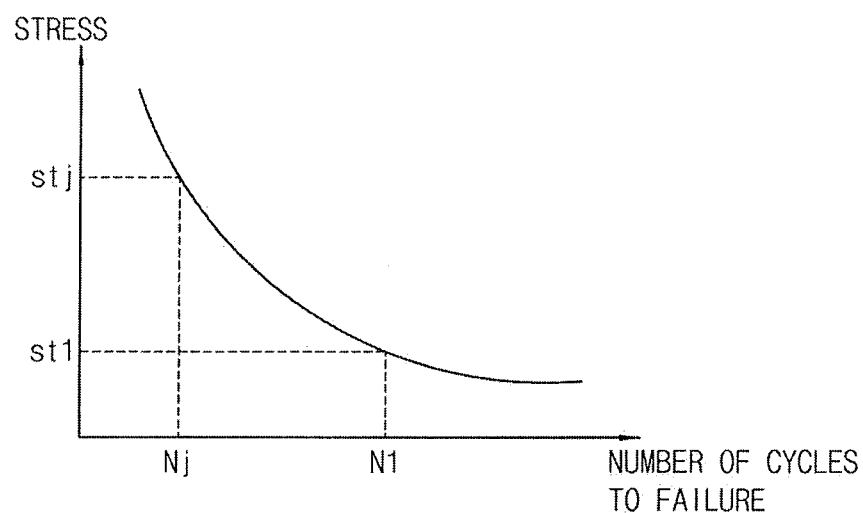
FIG. 9 illustrates an example of a stress-life curve.

FIG. 9 illustrating an example of a stress-life curve used for calculating damage. In FIG. 9, the horizontal axis represents a stress value (e.g., a level or magnitude) of the stress, and the vertical axis represents the maximum number of cycles for each stress value until when an error or a malfunction occurs on the SSD device 100. For example, the vertical axis in FIG. 9 may represent the maximum number of times of applying the stress having each stress value to the SSD device 100 until when the SSD device 100 breaks down.

As illustrated in FIG. 9, for example, when the stress having a first stress value st1 is repeatedly applied to the SSD device 100 a first number N1 of times since the SSD device 100 was initially operated after manufacturing process, an error or a malfunction may occur on the SSD device 100. Similarly, when stress having a j-th stress value stj is repeatedly applied to the SSD device 100 a j-th number Nj of times since the SSD device 100 was initially operated after manufacturing process, where j is a positive integer, an error or a malfunction may occur on the SSD device 100.

In some example embodiments, the stress-life curve may be predefined based on experimental data that are obtained by repetitive experiments for the system 10.

When the stress applied to the SSD device 100 has first through k-th stress values, where k is a positive integer, Miner's rule may be defined by Equation 1.

$$\sum_{i=1}^{k} \frac{n_i}{N_i} = C \quad (1)$$

In Equation 1, $n_i$ represents the number of cycles for each stress value, and $N_i$ represents the maximum number of cycles for each stress value. In other words, $n_i$ represents the number of times where the stress having an i-th stress value is repeatedly applied to the SSD device 100 since the SSD device 100 was initially operated after manufacturing process. $N_i$ represents the maximum number of times where the stress having the i-th stress value may be repeatedly applied to the SSD device 100 until when an error or a malfunction occurs on the SSD device. In Equation 1, C represents the damage of the SSD device 100.

An operation for calculating damage corresponding to stress based on Miner's rule and the stress-life curve will be described with reference to FIGS. 8 and 9.

Referring to FIG. 8, the SSD device 100 may calculate the number of cycles for each of stress values for the stress (operation S141). The stress may be periodically generated based on the sensing value SV that is periodically generated from the sensor 200, and may have one of the stress values.

The SSD device 100 may obtain, based on the stress-life curve, the maximum number of cycles for each of the stress values for the stress until an error occurs on the SSD device (operation S143).

The SSD device 100 may obtain the damage of the SSD device 100 by calculating a sum of a plurality of division results (operation S145). Each of the division results may be obtained, for example, by dividing the number of cycles for each of stress values by the maximum number of cycles for each of the stress values.

For example, the SSD device 100 may apply the number $n_i$ of cycles for each stress value (e.g., the number of times where the stress having the i-th stress value is repeatedly applied to the SSD device 100 since the SSD device 100 was initially operated after manufacturing process) and the maximum number $N_i$ of cycles for each stress value (e.g., the maximum number of times where the stress having the i-th stress value may be repeatedly applied to the SSD device 100 until when an error or a malfunction occurs on the SSD device) to Equation 1 to obtain damage C.

Referring again to FIG. 3, the SSD device 100 may determine the remaining life of the SSD device 100 based on a difference between a threshold value and the damage (operation S150). The threshold value may be predefined.

In some example embodiments, the SSD device 100 may determine the remaining life corresponding to the damage based on a remaining life conversion curve. The remaining life conversion curve may represent a relationship between the remaining life and the difference between the threshold value and the damage.

When the damage reaches the threshold value, an error or a malfunction may occur on the SSD device 100. Thus, the remaining life of the SSD device 100 may be relatively long as the difference between the threshold value and the damage increase. Similarly, the remaining life of the SSD device 100 may be relatively short as the difference between the threshold value and the damage decrease.

Figure 10:
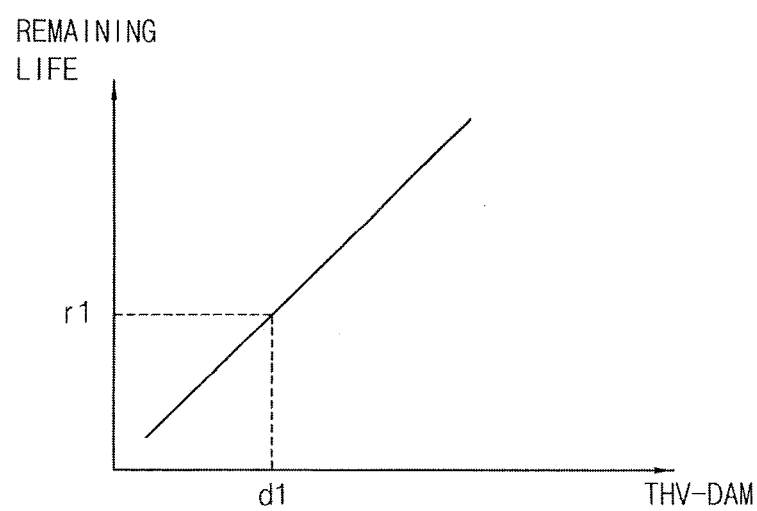
FIG. 10 illustrates an example of a remaining life conversion curve.

FIG. 10 illustrates an example of a remaining life conversion curve used for determining remaining life. In FIG. 10, the horizontal axis represents the difference between the threshold value and the damage, and the vertical axis represents the remaining life of the SSD device 100.

As illustrated in FIG. 10, the remaining life of the SSD device 100 may be proportional to the difference between the threshold value and the damage. For example, if the difference between the threshold value and the damage corresponds to "d1," the SSD device 100 may determine that the remaining life of the SSD device 100 corresponds to "r1." In some example embodiments, the remaining life conversion curve may be predefined based on experimental data that are obtained by repetitive experiments for the system 10.

As described with reference to FIGS. 1 through 10, the system 10 according to example embodiments may apply the sensing value SV that is periodically provided from the sensor 200 to the cumulative damage law. Thus, the system 10 may efficiently estimate the remaining life of the SSD device 100.

Figure 11:
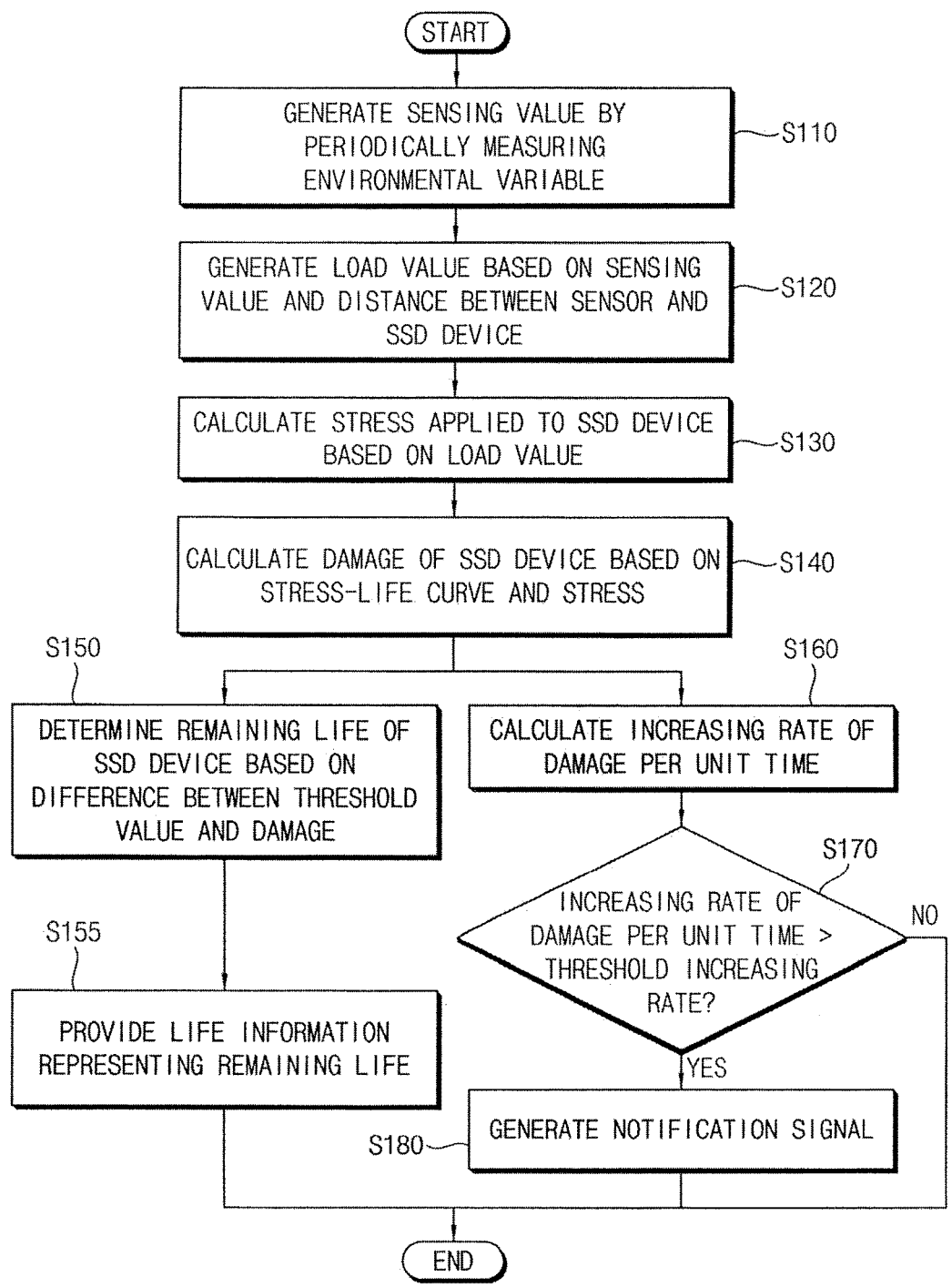
FIG. 11 illustrates another embodiment of a method for estimating the remaining life of an SSD device.

FIG. 11 illustrates another embodiment of a method for estimating the remaining life of a SSD device. The method of FIG. 11 may be performed, for example, by system 10 of FIG. 1. Operations S110~S150 in FIG. 11 may be substantially the same as operations S110~S150 in FIG. 3, respectively.

As described with reference to FIGS. 1 to 10, SSD device 100 may periodically update the damage based on the sensing value SV that is periodically provided from the sensor 200.

Referring to FIG. 11, the SSD device 100 may calculate an increasing rate of the damage per unit time (operation S160). Then, SSD device 100 may compare the increasing rate of the damage per unit time with a threshold increasing rate (operation S170). When the increasing rate of the damage per unit time is greater than the threshold increasing rate (operation S170: YES), the SSD device 100 may determined that accidental bumps and/or sudden damages or shocks occur on the SSD device 100 and/or the system 10. For example, when the system 10 is a car, the increasing rate of the damage per unit time may be greater than the threshold increasing rate by a car accident. For another example, when the system 10 is a drone, the increasing rate of the damage per unit time may be greater than the threshold increasing rate by a drone crash.

Thus, when the increasing rate of the damage per unit time is greater than the threshold increasing rate (operation S170: YES), the SSD device 100 may generate a notification signal (operation S180).

A user, a manager, or an administrator of the system 10 may take appropriate actions, e.g., may back up data stored in the SSD device 100 or may replace the SSD device 100 with a new SSD device, in response to the notification signal.

In some example embodiments, after operation S150, life information that represents the remaining life of the SSD device 100 may be provided to a user, a developer, and/or an engineer of the SSD device 100 and/or the system 10 (operation S155). The life information may be periodically or non-periodically provided.

Figure 12:
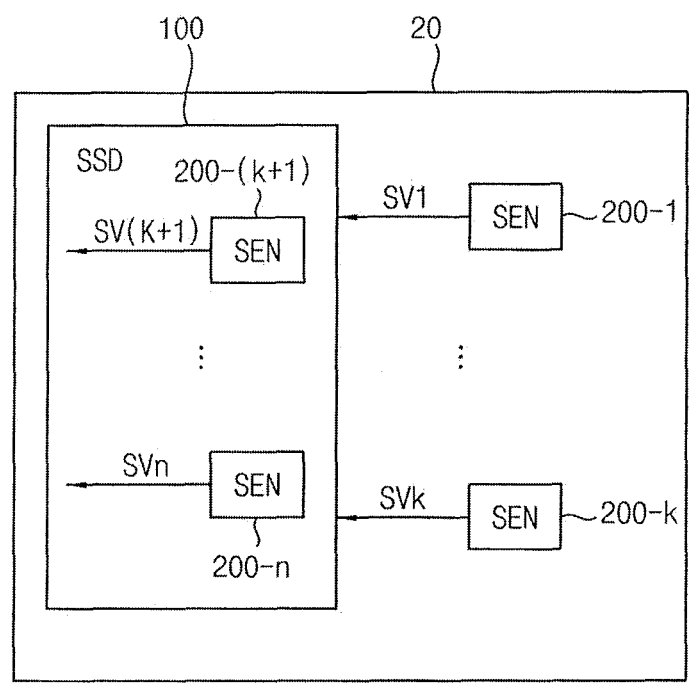
FIG. 12 illustrates another embodiment of a system.

FIG. 12 illustrates another embodiment of a system 20 which includes a solid state drive (SSD) device 100 and first through n-th sensors (SEN) 200-1~200-*n*, where n is a positive integer. In some example embodiments, system 20 may be one of various systems, e.g., a laptop computer, a car, an airplane, a drone, etc., that includes the SSD device 100.

The first through n-th sensors 200-1~200-*n* may be inside the SSD device 100 and outside the SSD device 100. For example, as illustrated in FIG. 12, the first through k-th sensors 200-1~200-*k* may be outside the SSD device 100, where k is a positive integer less than n. The (k+1)-th through n-th sensors 200-(*k*+1)~200-*n* may be inside the SSD device 100.

The first through n-th sensors 200-1~200-*n* generates first through n-th sensing values SV1~SVk and SV(k+1)~SVn by periodically measuring first through n-th environmental variables.

In some example embodiments, each of the first through n-th environmental variables may correspond to at least one of temperature, humidity, pressure, acceleration, vibration, mechanical stress, shock, radiation, dust, or electrical stress. In this example, each of the first through n-th sensors 200-1~200-n may include at least one of temperature sensor, humidity sensor, pressure sensor, acceleration sensor, vibration sensor, mechanical stress sensor, shock sensor, radiation sensor, dust sensor, or electrical stress sensor.

In one embodiment, the first through n-th sensors 200-1~200-n may generate the first through n-th sensing values SV1~SVn by measuring at least one of various environmental variables.

The SSD device 100 estimates the remaining life of the SSD device 100 based on the first through n-th sensing values SV1~SVn that are periodically provided from the first through n-th sensors 200-1~200-n. In some example embodiments, the SSD device 100 may apply the first through n-th sensing values SV1~SVn that are periodically provided from the first through n-th sensors 200-1~200-n to cumulative damage law to estimate the remaining life of the SSD device 100.

Figure 13:
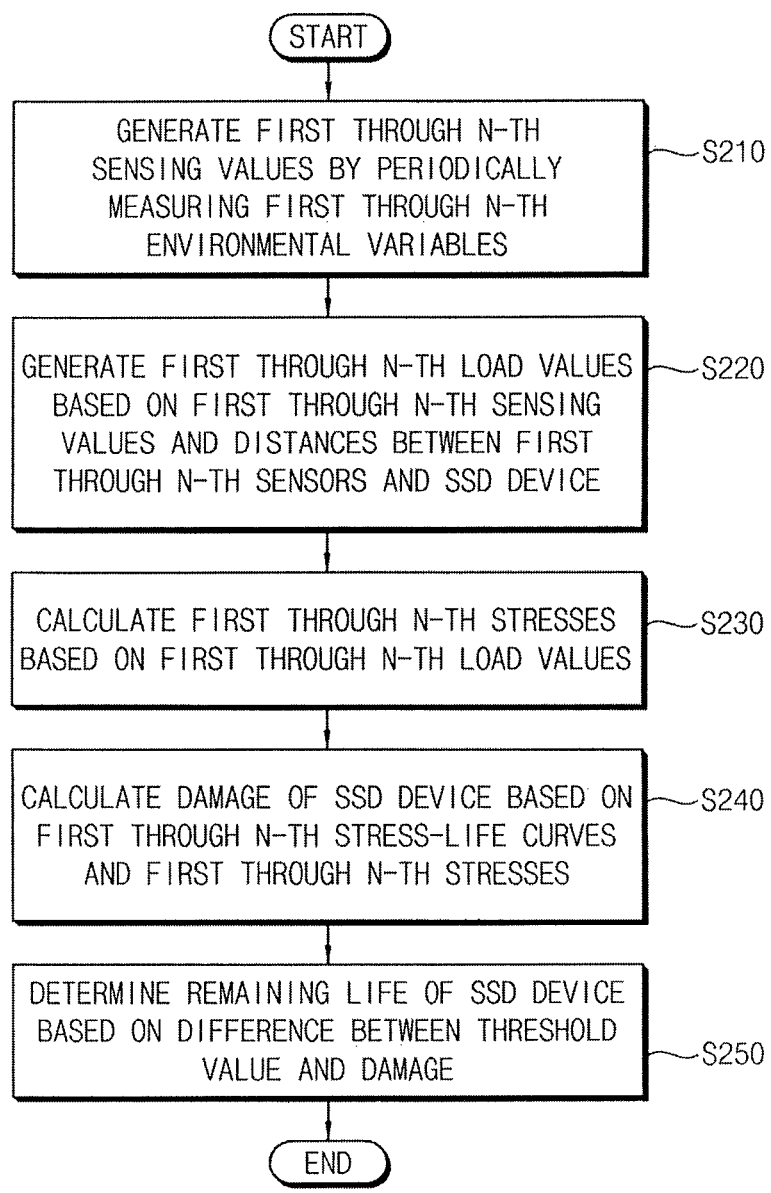
FIG. 13 illustrates another embodiment of a method for estimating the remaining life of an SSD device.

FIG. 13 illustrates another embodiment a method for estimating the remaining life of a SSD device. The method of estimating the remaining life of the SSD device of FIG. 13 may be performed by the system 20 of FIG. 12. Hereinafter, the method of estimating the remaining life of the SSD device 100 included in the system 20 will be described with reference to FIGS. 12 and 13.

Each of the first through n-th sensors 200-1~200-n may generate a respective one of the first through n-th sensing values SV1~SVn by periodically measuring a respective one of the first through n-th environmental variables (operation S210).

In some example embodiments, each of the first through n-th environmental variables may correspond to at least one of temperature, humidity, pressure, acceleration, vibration, mechanical stress, shock, radiation, dust, or electrical stress. In this example, each of the first through n-th sensors 200-1~200-n may include at least one of temperature sensor, humidity sensor, pressure sensor, acceleration sensor, vibration sensor, mechanical stress sensor, shock sensor, radiation sensor, dust sensor, or electrical stress sensor.

The SSD device 100 may receive the first through n-th sensing values SV1~SVn that are periodically generated from the first through n-th sensors 200-1~200-n. The SSD device 100 may generate first through n-th load values associated with the SSD device 100 based on the first through n-th sensing values SV1~SVn and distances between the first through n-th sensors 200-1~200-n and the SSD device 100 (operation S220).

In some example embodiments, the (k+1)-th through n-th environmental variables that are measured by the (k+1)-th through n-th sensors 200-(k+1)~200-n may be substantially the same as environmental variables that are applied to (e.g., affected to or has an effect on) the SSD device 100, because the (k+1)-th through n-th sensors 200-(k+1)~200-n are inside the SSD device 100. Thus, the SSD device 100 may provide the (k+1)-th through n-th sensing values SV(k+1)~SVn as the (k+1)-th through n-th load values without converting the (k+1)-th through n-th sensing values SV(k+1)~SVn. For example, the SSD device 100 may generate the (k+1)-th through n-th load values by performing one-to-one conversion on the (k+1)-th through n-th sensing values SV(k+)~SVn.

In other example embodiments, the first through k-th environmental variables that are measured by the first through k-th sensors 200-1~200-k may be different from environmental variables that are applied to (e.g., affected to or has an effect on) the SSD device 100. This is because the first through k-th sensors 200-1~200-k are outside the SSD device 100. Thus, the SSD device 100 may generate the first through k-th load values corresponding to the first through k-th sensing values SV1~SVk based on the distances between the first through k-th sensors 200-1~200-k and the SSD device 100. For example, the SSD device 100 may convert the first through k-th sensing values SV1~SVk to the first through k-th load values based on the distances between the first through k-th sensors 200-1~200-k and the SSD device 100.

For example, when one of the first through k-th sensors 200-1~200-k is relatively closer to the SSD device 100, the SSD device 100 may change a respective one of the first through k-th sensing values SV1~SVk by a relatively small value to generate a respective one of the first through k-th load values. In another example, when one of the first through k-th sensors 200-1~200-k is relatively farther to the SSD device 100, the SSD device 100 may change a respective one of the first through k-th sensing values SV1~SVk by a relatively large value to generate a respective one of the first through k-th load values.

In some example embodiments, the SSD device 100 may generate each of the first through k-th load values corresponding to a respective one of the first through k-th sensing values SV1~SVk based on a respective one of first through k-th load curves. Each of the first through k-th load curves may be defined based on the distance between a respective one of the first through k-th sensors 200-1~200-k and the SSD device 100. For example, each of the first through k-th load curves may be predefined based on experimental data that are obtained by repetitive experiments for the system 20.

The SSD device 100 may generate each of the first through k-th load values in a similar manner as described with reference to FIGS. 4, 5 and 6.

Then, the SSD device 100 may calculate first through n-th stresses that are applied to (e.g., affected to or has an effect on) the SSD device based on the first through n-th load values (operation S230).

In some example embodiments, the SSD device 100 may calculate each of the first through n-th stresses corresponding to a respective one of the first through n-th load values based on a respective one of predefined first through n-th load-stress conversion curves. The SSD device 100 may calculate each of the first through n-th stresses in a similar manner as described with reference to FIG. 7.

Then, the SSD device 100 may calculate damage of the SSD device based on first through n-th stress-life curves and the first through n-th stresses (operation S240). Each of the first through n-th stress-life curves may represent a relationship between a respective one of the first through n-th stresses and life (e.g., life span or desired life time) of the SSD device 100.

In some example embodiments, the SSD device 100 may calculate the damage corresponding to the first through n-th stresses based on the cumulative damage law. For example, the SSD device 100 may calculate the damage corresponding to the first through n-th stresses based on Miner's rule.

Figure 14:
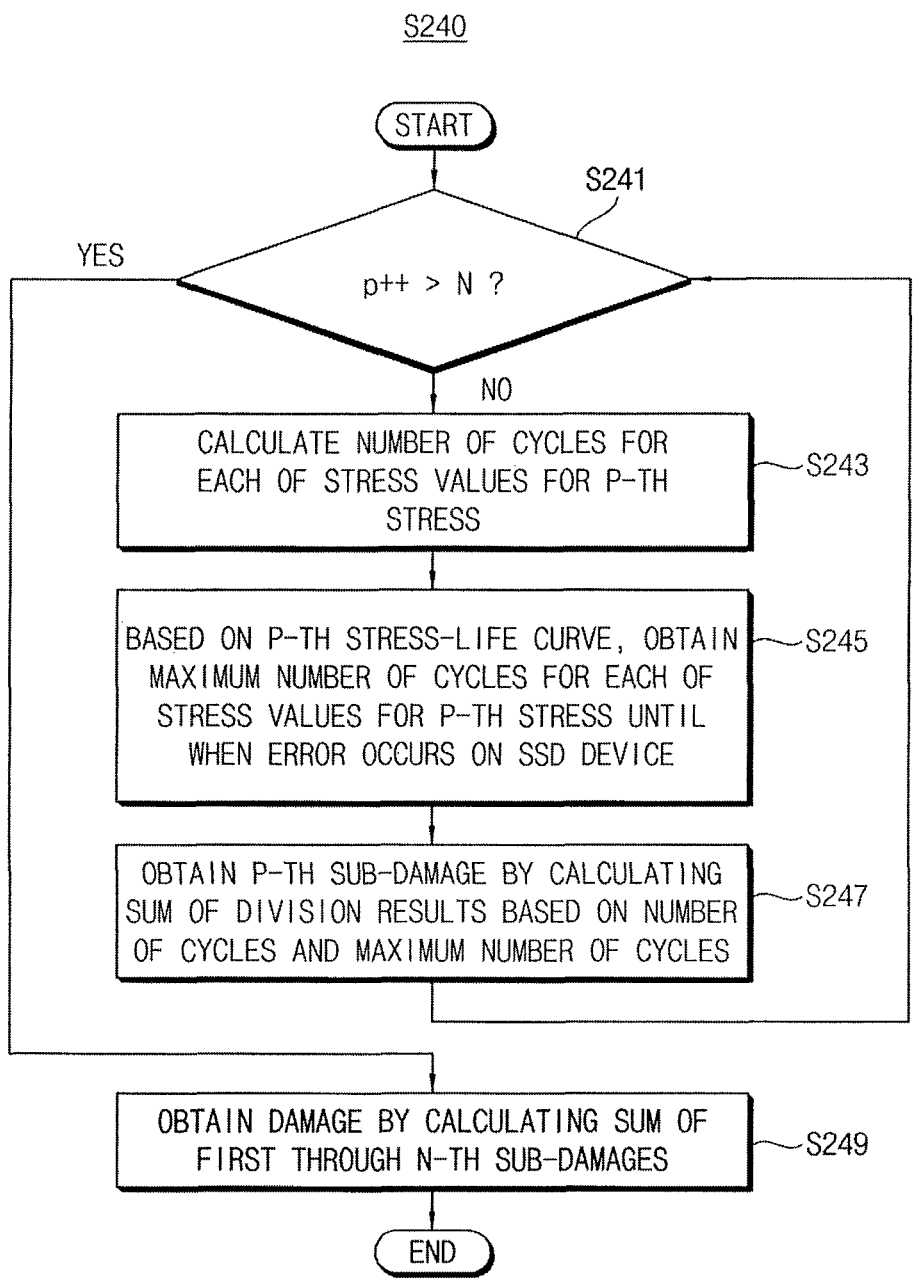
FIG. 14 illustrates another embodiment for calculating damage of an SSD device.

FIG. 14 illustrates an embodiment for calculating damage of the SSD device in FIG. 13. Each of the first through n-th stress-life curves may be defined in a similar manner as described with reference to FIG. 9.

Referring to FIG. 14, the SSD device 100 may calculate the number of cycles for each of stress values for the first stress (operation S243). The first stress may be periodically generated based on the first sensing value SV1 that is periodically generated from the first sensor 200-1, and may have one of the stress values.

The SSD device 100 may obtain, based on the first stress-life curve, the maximum number of cycles for each of the stress values for the first stress until an error occurs on the SSD device (operation S245).

The SSD device 100 may obtain a first sub-damage by calculating a sum of a plurality of division results (operation S247). Each of the division results may be obtained by dividing the number of cycles for each of stress values for the first stress by the maximum number of cycles for each of the stress values for the first stress.

For example, the SSD device 100 may apply the number $n_i$ of cycles for each stress value for the first stress (e.g., the number of times where the first stress having the i-th stress value is repeatedly applied to the SSD device 100 since the SSD device 100 was initially operated after manufacturing process) and the maximum number $N_i$ of cycles for each stress value for the first stress (e.g., the maximum number of times where the first stress having the i-th stress value can be repeatedly applied to the SSD device 100 until an error or a malfunction occurs on the SSD device) to Equation 1 to obtain the first sub-damage.

As illustrated in FIG. 14, the SSD device 100 may obtain second through n-th sub-damages by repeatedly performing operations S243, S245 and S247 for the second through n-th stresses (operation S241).

Then, the SSD device 100 may obtain the damage of the SSD device 100 by calculating a sum of the first through n-th sub-damages (operation S249).

Referring again to FIG. 13, the SSD device 100 may determine the remaining life of the SSD device 100 based on a difference between a threshold value and the damage (operation S250). The threshold value may be predefined.

In some example embodiments, the SSD device 100 may determine the remaining life corresponding to the damage based on a remaining life conversion curve. The remaining life conversion curve may represent a relationship between the remaining life and the difference between the threshold value and the damage. The SSD device 100 may determine the remaining life based on the remaining life conversion curve in a similar manner as described with reference to FIG. 10.

When the damage reaches the threshold value, an error or a malfunction may occur on the SSD device 100. Thus, the remaining life of the SSD device 100 may be relatively long as the difference between the threshold value and the damage increase. Similarly, the remaining life of the SSD device 100 may be relatively short as the difference between the threshold value and the damage decrease.

As described with reference to FIGS. 12 through 14, system 20 may apply the first through n-th sensing values SV1~SVn that are periodically provided from the first through n-th sensors 200-1~200-n to the cumulative damage law. Thus, the system 20 may efficiently estimate the remaining life of the SSD device 100. At least one of operations S155, S160, S170 and S180 in FIG. 11 may be further performed after operation S250 in FIG. 13, according to example embodiments.

Figure 15:
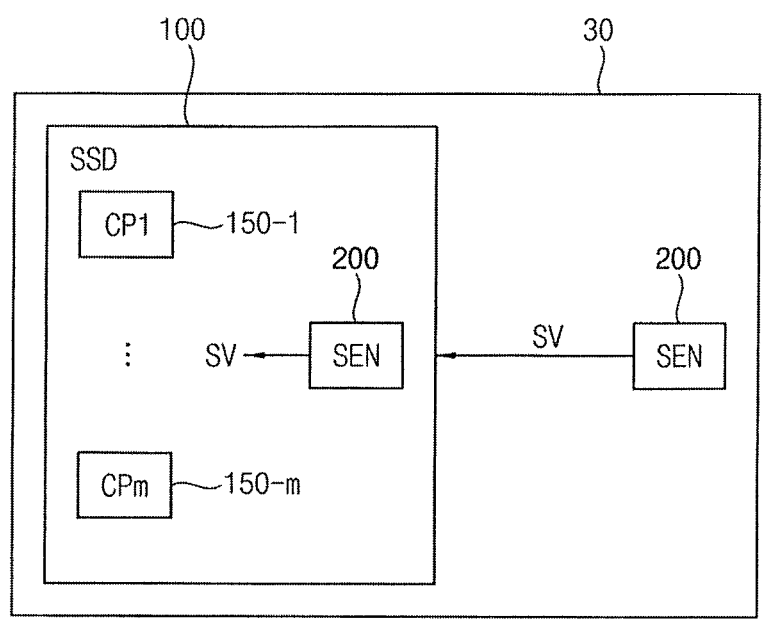
FIG. 15 illustrates another embodiment of a system.

FIG. 15 illustrates another embodiment of a system 30 which includes a solid state drive (SSD) device 100 and a sensor (SEN) 200. In some example embodiments, the system 30 may be one of various systems, e.g., a laptop computer, a car, an airplane, a drone, etc., that include the SSD device 100.

In some example embodiments, the sensor 200 may be inside the SSD device 100 or outside the SSD device 100, as illustrated in FIG. 15. The sensor 200 generates a sensing value SV by periodically measuring an environmental variable.

In some example embodiments, the sensor 200 may periodically measure the environmental variable, which corresponds to at least one of temperature, humidity, pressure, acceleration, vibration, mechanical stress, shock, radiation, dust, or electrical stress, to generate the sensing value SV. In this example, the sensor 200 may include at least one of temperature sensor, humidity sensor, pressure sensor, acceleration sensor, vibration sensor, mechanical stress sensor, shock sensor, radiation sensor, dust sensor, or electrical stress sensor. In one embodiment, the sensor 200 may generate the sensing value SV by measuring at least one of various environmental variables.

As illustrated in FIG. 15, the SSD device 100 may include first through m-th components (CP1~CPm) 150-1~150-m, where m is a positive integer greater than or equal to two.

Each of the first through m-th components 150-1~150-m may be one of various components or elements that are included in the SSD device 100. In some example embodiments, each of the first through m-th components 150-1~150-m may correspond to an electronic circuit such as semiconductor package, semiconductor chip, printed circuit board (PCB), etc. For example, each of the first through m-th components 150-1~150-m may correspond to at least one of the SSD controller 110 in FIG. 2, the nonvolatile memory devices 120-1, 120-2, . . . , 120-s in FIG. 2, and a PCB on which the SSD controller 110 and the nonvolatile memory devices 120-1, 120-2, . . . , 120-s in FIG. 2 are mounted.

In other example embodiments, each of the first through m-th components 150-1~150-m may correspond to an electrical connection member such as solder joint, solder ball, solder, etc. For example, each of the first through m-th components 150-1~150-m may correspond to at least one of as solder joint, solder ball, or solder that are included in the SSD controller 110 in FIG. 2, the nonvolatile memory devices 120-1, 120-2, . . . , 120-s in FIG. 2, and a PCB on which the SSD controller 110 and the nonvolatile memory devices 120-1, 120-2, . . . , 120-s in FIG. 2 are mounted. In one embodiment, the each of the first through m-th components 150-1~150-m may correspond to any component or element included in the SSD device 100.

The SSD device 100 estimates the remaining life of the SSD device 100 based on the sensing value SV that is periodically provided from the sensor 200. In some example embodiments, the SSD device 100 may apply the sensing value SV that is periodically provided from the sensor 200 to cumulative damage law to estimate the remaining life of the SSD device 100.

For example, the SSD device 100 may apply the sensing value SV that is periodically provided from the sensor 200 to the cumulative damage law, and may determine first through m-th candidate remaining lives of the first through m-th components 150-1~150-m. The SSD device 100 may determine a minimum remaining life among the first through m-th candidate remaining lives as the remaining life of the SSD device.

Figure 16:
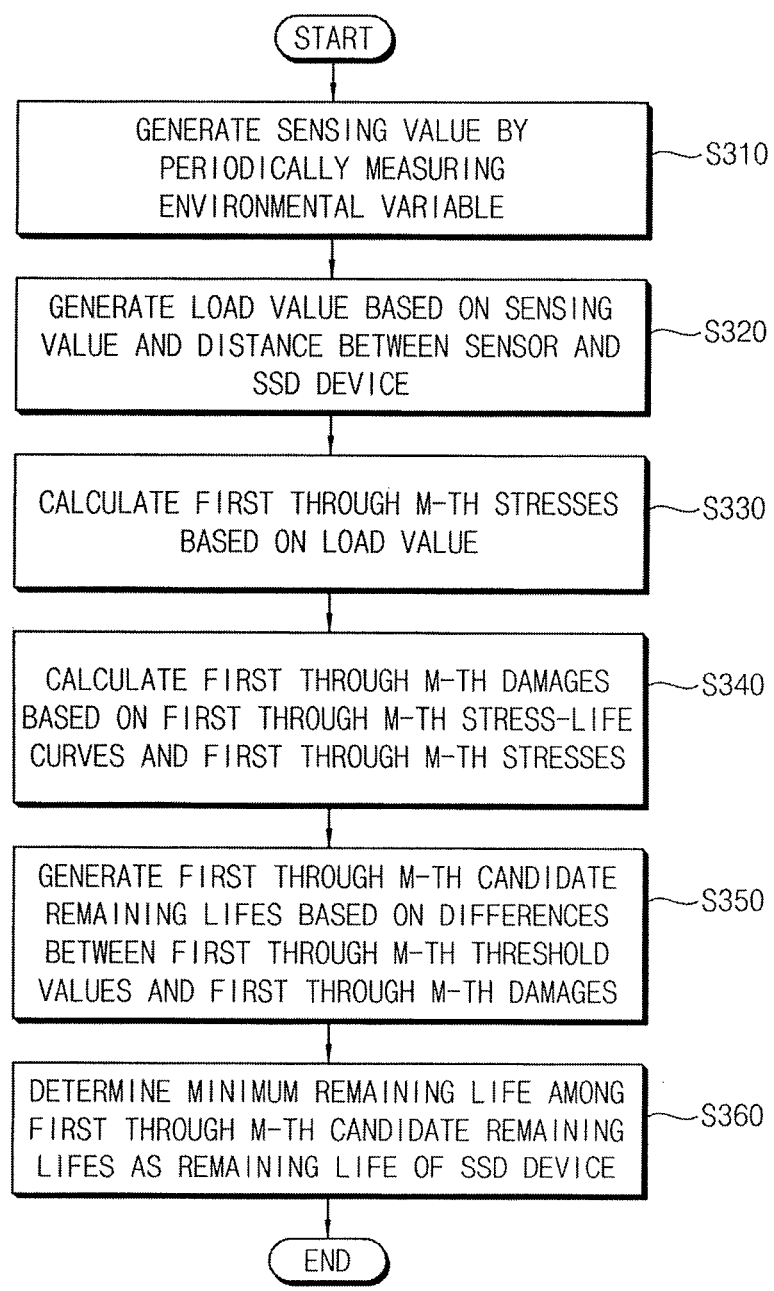
FIG. 16 illustrates another embodiment of a method for estimating the remaining life of an SSD device.

FIG. 16 illustrates another embodiment of a method for estimating remaining life of a SSD device. The method of estimating the remaining life of the SSD device of FIG. 16 may be performed, for example, by the system 30 of FIG. 15. Hereinafter, the method of estimating the remaining life of the SSD device 100 in the system 30 will be described with reference to FIGS. 15 and 16.

The sensor 200 may generate the sensing value SV by periodically measuring the environmental variable (operation S310). In some example embodiments, the sensor 200 may periodically measure the environmental variable, which corresponds to at least one of temperature, humidity, pressure, acceleration, vibration, mechanical stress, shock, radiation, dust, or electrical stress, to generate the sensing value SV. In this example, the sensor 200 may include at least one of temperature sensor, humidity sensor, pressure sensor, acceleration sensor, vibration sensor, mechanical stress sensor, shock sensor, radiation sensor, dust sensor, or electrical stress sensor.

The SSD device 100 may receive the sensing value SV that is periodically generated from the sensor 200. The SSD device 100 may generate a load value associated with the SSD device 100 based on the sensing value SV and a distance between the sensor 200 and the SSD device 100 (operation S320).

In some example embodiments, the sensor 200 may be inside the SSD device 100. In this example, the environmental variable that is measured by the sensor 200 may be substantially the same as an environmental variable that is applied to (e.g., affected to or has an effect on) the SSD device 100. The distance between the sensor 200 and the SSD device 100 may be zero. Thus, the SSD device 100 may provide the sensing value SV as the load value without converting the sensing value SV. For example, the SSD device 100 may generate the load value by performing one-to-one conversion on the sensing value SV.

In other example embodiments, the sensor 200 may be outside the SSD device 100. In this example, the environmental variable that is measured by the sensor 200 may be different from an environmental variable that is applied to (e.g., affected to or has an effect on) the SSD device 100. Thus, the SSD device 100 may generate the load value corresponding to the sensing value SV based on the distance between the sensor 200 and the SSD device 100. For example, the SSD device 100 may convert the sensing value SV to the load value based on the distance between the sensor 200 and the SSD device 100.

For example, when the sensor 200 is relatively closer to the SSD device 100, the SSD device 100 may change the sensing value SV by a relatively small value to generate the load value. For another example, when the sensor 200 is relatively farther to the SSD device 100, the SSD device 100 may change the sensing value SV by a relatively large value to generate the load value.

In some example embodiments, the SSD device 100 may generate the load value corresponding to the sensing value SV based on a load curve. The load curve may be defined based on the distance between the sensor 200 and the SSD device 100. For example, the load curve may be predefined based on experimental data that are obtained by repetitive experiments for the system 10.

The SSD device 100 may generate the load value in the same manner as described with reference to FIGS. 4, 5 and 6.

Then, the SSD device 100 may calculate first through m-th stresses that are applied to (e.g., affected to or have an effect on) the first through m-th components 150-1~150-m based on the load value (operation S330).

When a load corresponding to the load value is applied to the SSD device 100, stresses that are applied to the first through m-th components 150-1~150-m may be different from each other. Thus, when the load corresponding to the load value is applied to the SSD device 100, the SSD device 100 may individually and independently calculate the first through m-th stresses that are applied to the first through m-th components 150-1~150-m.

In some example embodiments, the SSD device 100 may calculate each of the first through m-th stresses corresponding to the load value based on a respective one of predefined first through m-th load-stress conversion curves. Each of the first through m-th load-stress conversion curves may correspond to a respective one of the first through m-th components 150-1~150-m.

Each of the first through m-th load-stress conversion curves may be defined in a similar manner as described with reference to FIG. 7. The SSD device 100 may calculate each of the first through m-th stresses in a similar manner as described with reference to FIG. 7.

Then, the SSD device 100 may calculate first through m-th damages of the first through m-th components 150-1~150-m based on first through m-th stress-life curves and the first through m-th stresses (operation S340). Each of the first through m-th stress-life curves may represent a relationship between a respective one of the first through m-th stresses and life (e.g., life span or desired life time) of the SSD device 100.

In some example embodiments, the SSD device 100 may calculate each of the first through m-th damages corresponding to a respective one of the first through m-th stresses based on the cumulative damage law. For example, the SSD device 100 may calculate each of the first through m-th damages corresponding to a respective one of the first through m-th stresses based on Miner's rule. Each of the first through m-th stress-life curves may be defined in a similar manner as described with reference to FIG. 9.

The SSD device 100 may calculate each of the first through m-th damages based on a respective one of the first through m-th stress-life curves in a similar manner as described with reference to FIGS. 8 and 9. Each of the first through m-th damages may correspond to damage of a respective one of the first through m-th components 150-1~150-m when the load corresponding to the load value is applied to SSD device 100.

Then, the SSD device 100 may determine first through m-th candidate remaining lives of the SSD device 100 based on differences between first through m-th threshold values and the first through m-th damages (operation S350). The first through m-th threshold values may be predefined. Each of the first through m-th candidate remaining lives may correspond to remaining life of a respective one of the first through m-th components 150-1~150-m.

In some example embodiments, the SSD device 100 may determine each of the first through m-th candidate remaining lives corresponding to a respective one of the first through m-th damages based on a respective one of first through m-th remaining life conversion curves. Each of the first through m-th remaining life conversion curves may represent a relationship between the remaining life and the difference between a respective one of the first through m-th threshold values and a respective one of the first through m-th damages.

Each of the first through m-th remaining life conversion curves may be defined in a similar manner as described with reference to FIG. 10.

The SSD device 100 may determine each of the first through m-th candidate remaining lives based on a respective one of the first through m-th remaining life conversion curves in a similar manner as described with reference to FIG. 10.

When t-th damage reaches a t-th threshold value, where t is a positive integer less than or equal to m, an error or a malfunction may occur on a t-th component. Thus, t-th candidate remaining life that corresponds to remaining life of the t-th component may be relatively long as a difference between the t-th threshold value and the t-th damage increase. Similarly, the t-th candidate remaining life may be relatively short as the difference between the t-th threshold value and the t-th damage decrease.

Then, the SSD device 100 may determine a minimum remaining life among the first through m-th candidate remaining lives as the remaining life of the SSD device 100 (operation S360).

As described above, each of the first through m-th candidate remaining lives may correspond to the remaining life of a respective one of the first through m-th components 150-1~150-m.

When an error or a malfunction occurs on one of the first through m-th components 150-1~450-m due to the end of its predefined life, an error or a malfunction may also occur on the SSD device 100.

Thus, the SSD device 100 may determine the minimum remaining life among the first through m-th candidate remaining lives that correspond to remaining lives of the first through m-th components 150-1~150-m as the remaining life of SSD device 100.

As described with reference to FIGS. 15 and 16, the system 30 according to example embodiments may apply the sensing value SV that is periodically provided from the sensor 200 to the cumulative damage law, may determine the first through m-th candidate remaining lives that correspond to remaining lives of the first through m-th components 150-1~150-m, and may determine the minimum remaining life among the first through m-th candidate remaining lives as the remaining life of the SSD device 100. Thus, the system 30 may efficiently estimate the remaining life of the SSD device 100.

At least one of operations S155, S160, S170, or S180 in FIG. 11 may be further performed after operation S360 in FIG. 16, according to example embodiments. The present disclosure may be used in various kinds of systems including the solid state drive (SSD) device.

Another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments described herein.

The code or instructions may be stored, for example, in a memory 121 (e.g., see FIG. 2) located in or coupled to SSD controller 110, and may implement the operations of the embodiments described herein. For example, a non-transitory computer readable medium stores a program in memory 121 for estimating a remaining life of a solid state drive (SSD) device in a system which includes a sensor.

The program includes first code to generate a load value associated with the SSD device, the load value based on a sensing value and a distance between the sensor and the SSD device, the sensing value based on a periodically measured environmental variable; second code to calculate stress applied to the SSD device based on the load value; third code to calculate damage of the SSD device based on a stress-life curve and the stress, the stress-life curve representing a relationship between the stress and life of the SSD device; and fourth code to determine the remaining life of the SSD device based on a difference between a threshold value and the damage. The environmental variable corresponds to at least one of temperature, humidity, pressure, acceleration, vibration, mechanical stress, shock, radiation, dust, or electrical stress.

The first code may generate the load value based on a load curve, and the load curve may be based on the distance between a sensor and the SSD device. The second code may calculate the stress corresponding to the load value based on a predefined load-stress conversion curve. The may calculate the damage based on cumulative damage law.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

The controllers, calculators, signal generating features, and signal processing features of the disclosed embodiments may be implemented in logic which, for example, may include hardware, software, or both. When implemented at least partially in hardware, the controllers, calculators, signal generating features, and signal processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, calculators, signal generating features, and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise indicated. Accordingly, various changes in form and details may be made without departing from the spirit and scope of the embodiments set forth in the claims.

What is claimed is:

1. A method for estimating a remaining life of a solid state drive (SSD) device in a system which includes a sensor, the method comprising:
generating, by the sensor, a sensing value by periodically measuring an environmental variable;
generating, by the SSD device, a load value associated with the SSD device based on the sensing value and a distance between the sensor and the SSD device;
calculating, by the SSD device, stress applied to the SSD device based on the load value;
calculating, by the SSD device, damage of the SSD device based on a stress-life curve and the stress, the stress-life curve representing a relationship between the stress and life of the SSD device; and
determining, by the SSD device, the remaining life of the SSD device based on a difference between a threshold value and the damage.

2. The method as claimed in claim 1, wherein the environmental variable corresponds to at least one of temperature, humidity, pressure, acceleration, vibration, mechanical stress, shock, radiation, dust, or electrical stress.

3. The method as claimed in claim 1, wherein the sensor is inside the SSD device.

4. The method as claimed in claim 3, further comprising:
providing, by the SSD device, the sensing value as the load value without converting the sensing value.

5. The method as claimed in claim 1, wherein the sensor is outside the SSD device.

6. The method as claimed in claim 5, wherein:
generating, by the SSD device, the load value corresponding to the sensing value is based on a load curve, and the load curve is based on the distance between the sensor and the SSD device.

7. The method as claimed in claim 1, wherein:
calculating, by the SSD device, the stress corresponding to the load value is based on a predefined load-stress conversion curve.

8. The method as claimed in claim 1, wherein:
calculating, by the SSD device, the damage corresponding to the stress is based on cumulative damage law.

9. The method as claimed in claim 1, wherein calculating the damage includes:
calculating a number of cycles for each of stress values for the stress, the stress being periodically generated and having one of the stress values;
obtaining, based on the stress-life curve, a maximum number of cycles for each of the stress values for the stress until an error occurs on the SSD device; and
obtaining the damage by calculating a sum of a plurality of division results, each of the division results being obtained by dividing the number of cycles for each of stress values by the maximum number of cycles for each of the stress values.

10. The method as claimed in claim 1, wherein:
determining, by the SSD device, the remaining life corresponding to the damage is based on a remaining life conversion curve,
the remaining life conversion curve represents a relationship between the remaining life and the difference between the threshold value and the damage.

11. The method as claimed in claim 1, further comprising:
calculating, by the SSD device, an increasing rate of the damage per unit time; and
generating, by the SSD device, a notification signal when the increasing rate of the damage per unit time is greater than a threshold increasing rate.

12. A method for estimating a remaining life of a solid state drive (SSD) device in a system which includes first through n-th sensors, where n is a positive integer greater than or equal to two, the method comprising:
generating, by the first through n-th sensors, first through n-th sensing values by periodically measuring first through n-th environmental variables;
generating, by the SSD device, first through n-th load values associated with the SSD device based on the first through n-th sensing values and distances between the first through n-th sensors and the SSD device;
calculating, by the SSD device, first through n-th stresses applied to the SSD device based on the first through n-th load values;
calculating, by the SSD device, damage of the SSD device based on first through n-th stress-life curves and the first through n-th stresses, each of the first through n-th stress-life curves representing a relationship between a respective one of the first through n-th stresses and life of the SSD device; and
determining, by the SSD device, the remaining life of the SSD device based on a difference between a threshold value and the damage.

13. The method as claimed in claim 12, wherein:
each of the first through n-th environmental variables correspond to at least one of temperature, humidity, pressure, acceleration, vibration, mechanical stress, shock, radiation, dust, or electrical stress.

14. The method as claimed in claim 12, wherein:
the first through k-th sensors are outside the SSD device, where k is a positive integer less than n,
the (k+1)-th through n-th sensors are inside the SSD device.

15. The method as claimed in claim 14, wherein:
the SSD device is to generate the first through k-th load values corresponding to the first through k-th sensing values based on first through k-th load curves,
each of the first through k-th load curves is defined based on the distance between a respective one of the first through k-th sensors and the SSD device,
the SSD device is to provide the (k+1)-th through n-th sensing values as the (k+1)-th through n-th load values without converting the (k+1)-th through n-th sensing values.

16. The method as claimed in claim 12, wherein calculating the damage includes:
calculating a number of cycles for each of stress values for a stress, the stress being periodically generated and having one of the stress values;
obtaining, based on one of the n-th stress-life curves, a maximum number of cycles for each of the stress values for the stress until an error occurs on the SSD device;
obtaining a sub-damage by calculating a sum of a plurality of division results, each of the division results being obtained by dividing the number of cycles for each of stress values by the maximum number of cycles for each of the stress values; and
obtaining the damage by calculating a sum of first through n-th sub-damages.

17. A method for estimating a remaining life of a solid state drive (SSD) device in a system which includes a sensor, the SSD device including first through m-th components, where m is a positive integer greater than or equal to two, the method comprising:
generating, by the sensor, a sensing value by periodically measuring an environmental variable;

generating, by the SSD device, a load value associated with the SSD device based on the sensing value and a distance between the sensor and the SSD device;

calculating, by the SSD device, first through m-th stresses applied to the first through m-th components based on the load value;

calculating, by the SSD device, first through m-th damages of the first through m-th components based on first through m-th stress-life curves and the first through m-th stresses, each of the first through m-th stress-life curves representing a relationship between a respective one of the first through m-th stresses and life of the SSD device;

determining, by the SSD device, first through m-th candidate remaining lives of the SSD device based on differences between first through m-th threshold values and the first through m-th damages; and determining, by the SSD device, a minimum remaining life among the first through m-th candidate remaining lives as the remaining life of the SSD device.

18. The method as claimed in claim 17, wherein each of the first through m-th components corresponds to at least one of a semiconductor package, a semiconductor chip, a solder joint, a printed circuit board, or solder.

19. The method as claimed in claim 17, wherein:

calculating, by the SSD device, the first through m-th stresses corresponding to the load value is based on predefined first through m-th load-stress conversion curves, each of the first through m-th load-stress conversion curves correspond to a respective one of the first through m-th components.

20. The method as claimed in claim 17, wherein:

the SSD device is to determine the first through m-th candidate remaining lives corresponding to the first through m-th damages based on first through m-th remaining life conversion curves, and each of the first through m-th remaining life conversion curves represents a relationship between the remaining life and the difference between a respective one of the first through m-th threshold values and a respective one of the first through m-th damages.

* * * * *